Figure 1:
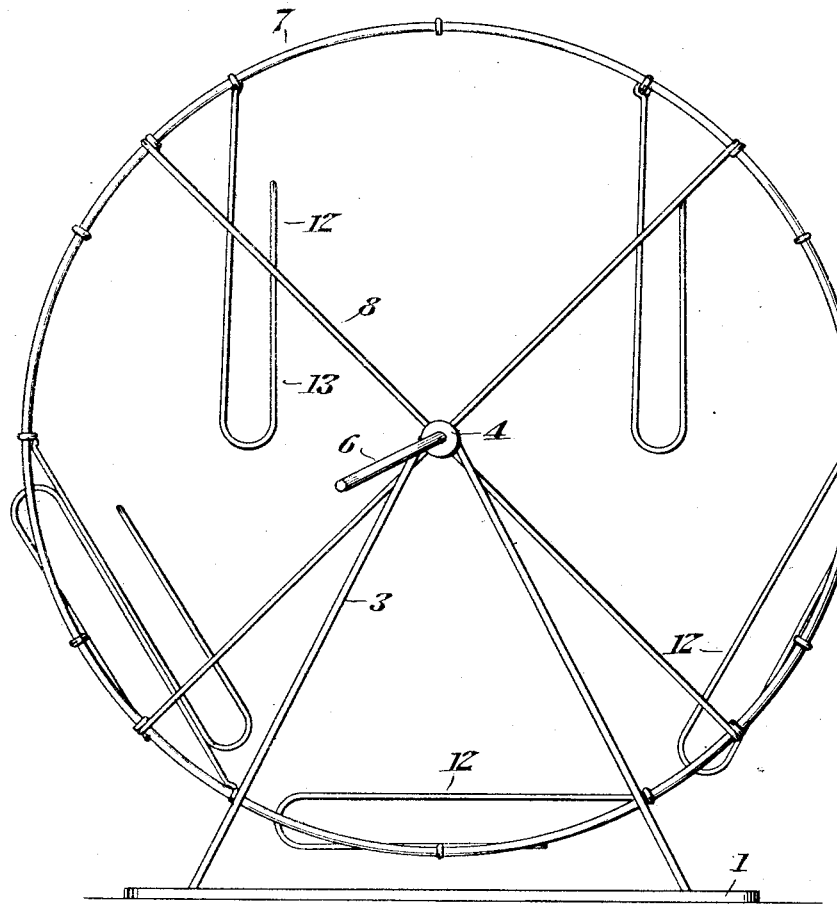

G. S. GUMAER.
BREAD TOASTER.
APPLICATION FILED MAY 23, 1916.

1,212,051.

Patented Jan. 9, 1917.
2 SHEETS—SHEET 1.

Witnesses

Inventor
George S. Gumaer
By Victor J. Evans
Attorney

G. S. GUMAER.
BREAD TOASTER.
APPLICATION FILED MAY 23, 1916.
1,212,051.
Patented Jan. 9, 1917.
2 SHEETS—SHEET 2.
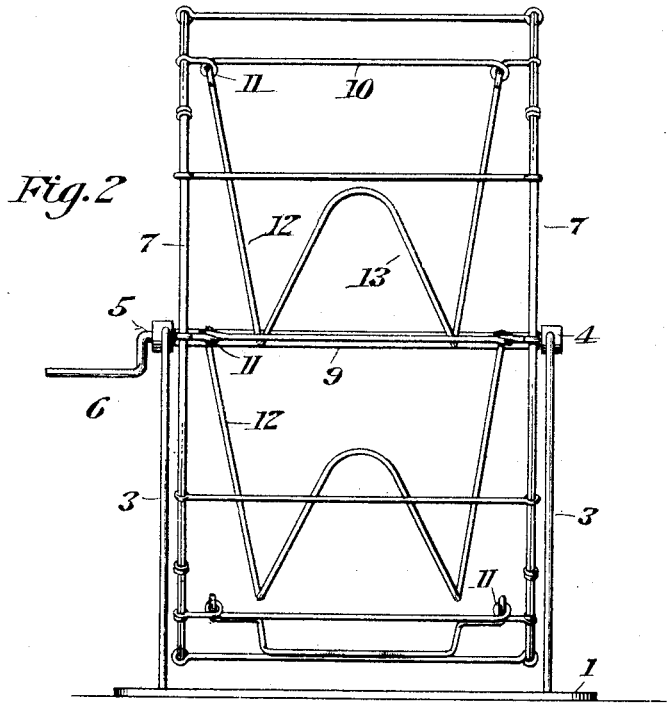
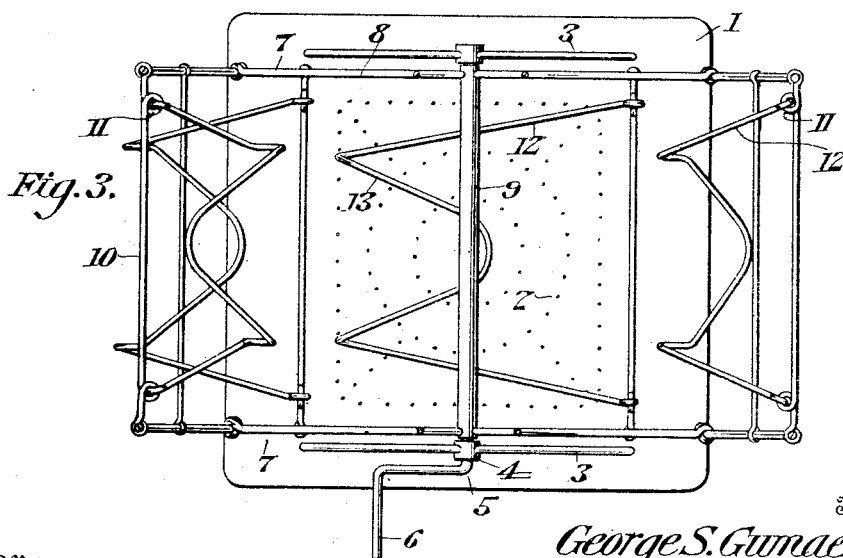
Witnesses
Inventor
George S. Gumaer
By Victor J. Evans
Attorney

UNITED STATES PATENT OFFICE.

GEORGE S. GUMAER, OF CORONADO, CALIFORNIA.

BREAD-TOASTER.

1,212,051. Specification of Letters Patent. Patented Jan. 9, 1917.

Application filed May 23, 1916. Serial No. 99,375.

*To all whom it may concern:*

Be it known that I, GEORGE S. GUMAER, a citizen of the United States, residing at Coronado, in the county of San Diego and State of California, have invented new and useful Improvements in Bread-Toasters, of which the following is a specification.

This invention relates to grills, gridirons, or the like and has particular application to a bread toaster.

The chief characteristic of this invention resides in the provision of a device of this character which will enable a person to toast a plurality of slices of bread without necessitating the handling of the bread during the toasting operation.

Another important object of this invention is to provide a device of this character which is mounted for rotary movement to successively toast one side of the slices of bread and to successively toast the opposite side of the slices when the direction of rotation of the toaster is reversed.

Another important object of this invention is to provide a device of this character having the desirable features of simplicity, efficiency and durability, and furthermore a device which may be manufactured at a nominal cost.

Another object of this invention is to provide a device of this character which is readily applicable to a gas burner and means associated with the toaster for equally distributing the flame over the surface of the bread.

Other objects of the invention will appear as the specification is read in connection with the accompanying drawings, in which:—

Figure 1 is a side elevation of my device constructed in accordance with the invention. Fig. 2 is an end elevation of the same. Fig. 3 is a horizontal central section of Fig. 1.

Referring to the drawings in detail, my invention consists in this instance of a base 1 which is formed of a single sheet of material such as metal or the like and is preferably rectangular in formation. The base 1 is provided with a series of perforations 2 which are adapted to evenly distribute the flame from the gas burner throughout the surface of the base when the same is applied thereto as will be hereinafter described. Arranged upon opposite edges of the base 1 and upstanding therefrom are a pair of standards 3 arranged in spaced parallel relation to each other and which are in this instance single pieces of wire bent in the form of an inverted V, the apex of each standard being formed with bearings 4. Rotatably mounted within the bearings 4 are the opposite extremities of a shaft 5, one end of which is extended a suitable distance and bent at right angles to provide a handle 6.

Disposed between the standards 3 and keyed upon the shaft 5 are a pair of wheels 7 which are arranged in spaced parallel relation with each other and both of which are of an equal diameter. The wheels 7 are provided with the usual spokes 8 and the hubs 9, the latter being keyed to the shaft in any suitable manner. The rims of each of the wheels 7 are formed of a single piece of wire bent in the form of an annuli and are connected together and held in spaced relation to each other by means of the cross bars 10. The cross bars 10 are placed at intervals around the circumference of the wheels and every alternate bar is bent upon itself adjacent its opposite ends to provide the inwardly extending eyes 11. Swingingly mounted within each of the bars provided with the eyes 11 are grills or bread carrying members generally indicated as at 12. These bread carrying members or grills 12 are adapted to lie within the rims of each of the wheels 7 and between the confronting faces thereof and are mounted in such a manner as to permit free swinging movement when the wheels are rotated. The grills 12 comprise a single piece of wire, the opposite extremities of which are mounted within the eyes 11 of one of the cross bars 10 while the intermediate portion of the wire is bent so as to form the substantially U-shaped clasp 13, the open end of which is disposed toward the periphery of the wheel so that the slices of bread will be securely held between the jaws of the clasp during the rotation of the wheel and also permitting the ready removal of the same. The clasp portion 13 of the grill 12 is of such a length as to engage the adjacent cross bar on either side of the pivot of the grill whereby the outward movement of the grill during the rotation of the wheels will be limited.

From the foregoing description it will be seen that when the wheels are rotated by means of the handle 6, the grills being mounted for swinging movement between the wheels, they will gravitate toward the periphery of the wheels so as to abut one of the cross bars 10 whereby they will assume a horizontal position when nearing the base 1. In other words, assuming that one of the grills is disposed at the upper part of the wheels and is in perpendicular position and directly above the shaft 5, upon rotating the wheels clockwise, this same grill will gravitate toward the periphery of the wheels so as to engage one of the cross bars 10 and upon reaching the base 1 the grill will have assumed a horizontal position and thus present one side of the slice of bread to the base plate. When rotating the wheels in the opposite direction the reverse movement of the grills takes place so as to present the opposite side of the bread toward the base plate as will be understood. It will thus be seen that the slices of bread may be thoroughly toasted upon opposite sides depending upon which direction the wheels are rotated, and that the slices of bread may be thoroughly toasted without the handling of the same during the toasting operation.

Although I have shown manual means for operating the wheels, I wish it to be clearly understood that mechanical means of any suitable description may be connected with the shaft 5 to impart movement to the wheels 7 without departing from the spirit of this invention.

As the slices of bread pass successively over the base 1, the flame being equally distributed by means of the perforations throughout the surface of the base will cause the bread to be thoroughly toasted, the movement of the bread being regulated in proportion to the amount of heat given off by the burner.

It will be noted that in providing the wheels with the cross bars to limit the movement of the grills, they will be prevented from falling lower than the mean circumference of the wheel and thus prevent the toast or bread from coming in too close contact with the base.

It is thought from the foregoing taken in connection with the accompanying drawings that the construction and operation of my device will be apparent to those skilled in the art without further description, and that minor changes in size, shape, proportion and minor details of construction may be made without departing from the spirit and scope of the appended claims.

What I claim is:

1. A toaster comprising a frame mounted for rotary movement, grills pivotally mounted upon the frame, and means engageable with the grills for limiting their movement in one direction whereby upon the rotation of the frame, the grills will gravitate to horizontal position at the lowermost point of the frame.

2. A toaster comprising a revoluble member, grills mounted for free swinging movement upon said revoluble member so as to automatically assume by gravity a horizontal position at a point in the path of revolution of said revoluble member, and means for limiting the movement of the grills beyond a predetermined point in assuming such position.

3. A toaster comprising a revoluble member composed of spaced side pieces and interconnecting cross pieces, and grills mounted upon certain of said cross pieces to automatically assume by gravity a horizontal position at a point in the path of revolution of the revoluble member, and limited in such movement by other cross pieces.

4. In combination, a pair of spaced wheels mounted for rotary movement, cross bars connecting the wheels at the circumference thereof, and a plurality of grills suspended within the wheels and engageable with the bars for preventing the grills from falling lower than the mean circumference of the wheels during the rotation of the latter.

5. A toaster comprising a revoluble member consisting of spaced sides connected by cross pieces, U-shaped grills pivotally mounted for swinging movement between the sides of the member upon alternate cross pieces so as to assume by gravity a horizontal position at a point in the path of revolution of said member, said grills being arranged to engage the intervening cross pieces to limit their gravital movement beyond a predetermined point.

6. A toaster comprising a revoluble member having spaced sides, grills pivotally mounted upon said revoluble member between said spaced sides for free swinging movements so as to assume by gravity a horizontal position at a point in the revolution of said member, and means carried by said member for limiting the gravital movements of the grills beyond a predetermined position.

7. In combination, a pair of spaced annuli mounted for rotary movement, bars rigidly connecting the annuli at the peripheries thereof, grills carried by certain of the bars and mounted for swinging movement between the annuli and engageable with the remaining bars for limiting the outward movement thereof.

In testimony whereof I affix my signature.

GEORGE S. GUMAER.

Witnesses:
 W. W. DONN,
 FRED O. DORRIS.

Copies of this patent may be obtained for five cents each, by addressing the "Commissioner of Patents, Washington, D. C."